United States Patent [19]

Just

[11] 4,043,847
[45] Aug. 23, 1977

[54] HARDENING PROCESS FOR CRANKSHAFTS

[75] Inventor: Karl Just, Immenstaad, Germany

[73] Assignee: Motoren- und Turbinen-Union Friedrichshafen GmbH, Germany

[21] Appl. No.: 634,775

[22] Filed: Nov. 24, 1975

[30] Foreign Application Priority Data

Nov. 22, 1974  Germany .............................. 2455285

[51] Int. Cl.² .............................................. C21D 9/30
[52] U.S. Cl. ..................................... 148/146; 148/39; 148/150; 148/152
[58] Field of Search ............... 148/146, 150, 152, 144, 148/39, 154

[56] References Cited

U.S. PATENT DOCUMENTS

| 2,213,241 | 9/1940 | Denneen et al. ...................... 148/146 |
| 3,377,214 | 4/1968 | Woodbridge et al. ................. 148/146 |

*Primary Examiner*—R. Dean
*Attorney, Agent, or Firm*—Craig & Antonelli

[57] ABSTRACT

A hardening process for a crankshaft which includes subjecting the crankshaft to a first induction hardening process to produce a hardened layer of a substantial thickness at all bearing locations and at all transitional points between the crank pins, journal pins and crank webs. Subsequently tempering the hardened zones of the crankshaft at the transitional points to a hardness value permitting a subsequent alignment of the crankshaft. Subjecting the crankshaft to a further induction hardening process to provide a second hardened layer only at the bearing locations which second layer has a depth which is less than the depth of the first hardened layer. The thus processed crankshaft is then subject to an expansion process to eliminate internal stresses therein.

10 Claims, 1 Drawing Figure

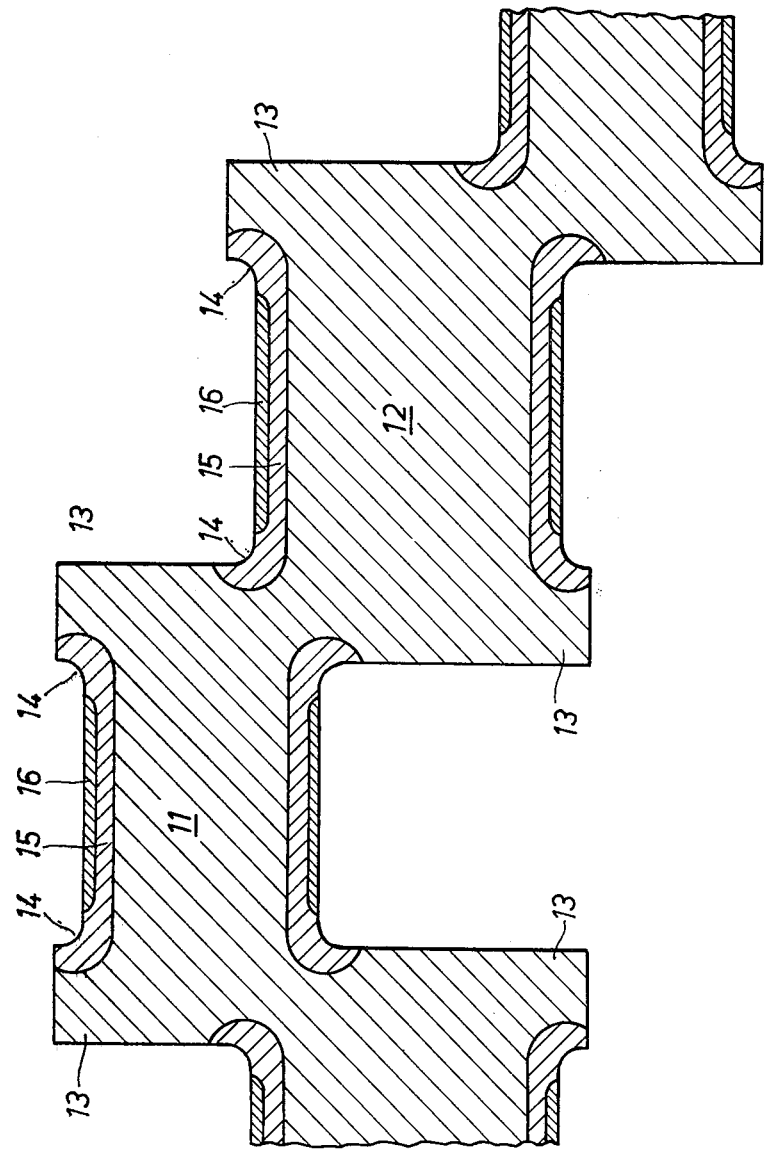

HARDENING PROCESS FOR CRANKSHAFTS

The present invention relates to a surface hardening process, and more particularly, to a process for induction surface hardening of crankshafts for the purpose of attaining a high wear resistance of all bearing locations of the crankshaft with a sufficient long term alternating stress strength at rounded zones forming the transition of journals into the crank webs.

The induction surface hardening of bearing locations of crankshafts has been known for many years and such induction surface hardening has proven itself well with respect to attaining wear resistance of the journal surfaces while maintaining a tough crankshaft core.

To attain sufficient long term alternating stress strength at the rounded zones forming the transistional points between the journals and crank webs, it has been proposed to incorporate the zones into the induction surface hardening process; however, in so doing, a large amount of warping is produced at the crankshaft which cannot be corrected by an alignment due to the occurring brittleness of the hardened surfaces. Therefore, it is normally necessary to add a large quantity of material prior to the heat treatment of the crankshaft with a subsequent corresponding removal of such material.

Furthermore, it is known, for example, in German Patent No. 1,284,981 to provide long term alternating stress strength in the rounded zones of the crankshaft by a nitriding process. Due to the minor hardening warpage during nitriding, a subsequent aligning of the crankshaft becomes superfluous. However, the nitriding process for providing the long term alternating stress strength requires great expenditures because the surfaces of the crankshaft which are not to be hardened must be covered prior to nitriding in order to avoid the high brittleness which would endanger the crankshaft during each further transport thereof, during subsequent machining steps, and also when the crankshaft is being mounted in the engine. Furthermore, the proposed nitriding process results in the production of a nitriding layer which is very thin and there is considerable danger that the thin nitriding layer is removed at least along the end faces of the crank webs when the grinding operation of the crankshaft is being completed and, especially, during a subsequent machining of the crankshaft in case of a repair.

The present invention is concerned with the task to provide a hardening process for crankshafts which eliminate the aforementioned shortcomings.

The underlying problems are solved in accordance with the present invention in that the crankshaft is subjected to two hardening processes with the first process providing a relatively thick hardening layer at the bearing locations and the rounded transitional points and the second hardening process providing a thinner layer only at the bearing locations.

According to the present invention, the crankshaft is first subjected to an induction hardening process to provide a hardened layer of all bearing locations and rounded zones of the crankshaft which layer is of a substantial thickness. The hardened zones of the crankshaft are tempered to a hardness value permitting a subsequent alignment of the crankshaft at the rounded zones and effecting a considerable increase in the long term alternating stress strength as compared to the unhardened sections of the crankshaft. Subsequently, the crankshaft is subjected to a second induction hardening process of only the bearing locations without effecting the rounded transitional zones whereby a hardening layer is formed on the bearing locations which has a depth which is less than the depth of the first hardening layer. The entire crankshaft is then subjected to a heat treatment or expansion process so that high hardness and wear resistance remains at the bearing locations while the internal stresses are simultaneously eliminated.

The advantageous features of the process in accordance with the present invention reside in the fact that the long term alternating stress strength in the rounded zones can be accurately determined. Furthermore, a long term alternating stress strength zone of sufficient thickness as compared to the conventional nitriding process can be produced in a substantially shorter period of time and thus more economically with the stress strength zone permitting an alignment of the crankshaft after the hardening process. Also, the process of the present invention can advantageously be utilized for a larger number of alloyed and non-alloyed steel types.

Accordingly, it is an object of the present invention to provide a hardening process for crankshafts which avoids the aforementioned shortcomings and drawbacks encountered in the prior art.

Another object of the present invention resides in providing a hardening process for crankshafts whereby the necessary hardness and long term alternating stress strength values at the bearing locations and rounded transitional points of the crankshaft can be realized in a relatively simple manner.

A further object of the present invention resides in providing a hardening process for a control system which is relatively inexpensive and which can be effected in a substantially shorter period of time as compared with conventional hardening processes.

These and further objects, features and advantages of the present invention will become more apparent from the following description when taken in connection with the accompanying drawing which shows, for the purposes of illustration only, a single embodiment in accordance with the present invention, and wherein:

The single FIGURE is a partial cross-sectional view of a hardened crankshaft in accordance with the present invention.

As shown in the single FIGURE, the crankshaft includes a crank pin 11, and a journal pin 12 which are joined by crank webs 13. The transitional points between the pins 11, 12 and the crank webs 13 are formed as rounded zones 14 to lower the high long term alternating bending stresses which occur at these locations to a maximum extent.

According to the present invention, the crankshaft is first hardened by an induction hardening process whereby a layer 15 having a substantial thickness is provided on all bearing locations and rounded zones 14. By providing the relatively thick layer 15, it is assured that the hardness layer is not abraded during finishing operations and during subsequent machining of the crankshaft in case of a repair or the like. Depending upon the degree of carbon content of the material, a degree of hardness of approximately 60 Rockwell (HRC) is preferred at the layer 15. Preferably, the layer 15 has a thickness in the range of 6-9 mm.

The hardened regions are then tempered, for example, in a salt bath whereby the hardness value of the layer 15 is reduced to about 42-43 HRC. The hardness value will permit a subsequent alignment of the crankshaft at the rounded zones and which effects term alternating stress strength at a considerable increase in the long term alternating stress strength as compared to the unhardened sections of the crankshaft. Subsequently only the bearing locations are hardened by an induction hardening process with care being taken so as to not harden the rounded zones 14.

A second induction hardening process is effected resulting in the provision of a layer 16 having a hardening depth which is less than the hardening depth of the layer 15; however, the depth of the layer 16 is such that during a subsequent machining of the crankshaft, in case of a repair, the high hardness and wear resistance of the bearing locations are not affected. Furthermore, the smaller depth of the layer 16 makes it easier to ensure that the rounded zones 14 are not affected by the second hardening step. Preferably, the thickness of the layer 16 is about 3 mm. However, the thickness may be increased to the thickness of the layer 15 and beyond but in such situations, with respect to final grinding and regrinding in case of repair it would be more difficult to leave the rounded zones unaffected. Preferably, the hardness value of the layer 16 after the second induction hardening process is approximately 60 HRC.

The entire crankshaft is then subjected to an expansion (tempering) process, for example, treated in a salt bath whereby the high hardness and wear resistance at the bearing locations are substantially maintained while the internal stresses in the crankshaft are simultaneously eliminated. Upon completion of all the process steps the layer 15 will have a hardness value of approximately 42–43 HRC and the layer 16 will have a hardness value by comparision of 50–53 HRC.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A process for hardening a crankshaft which includes bearing locations defined by crank pins, journal pins and crank webs with the respective transitional areas between the crank pins, journal pins and crank webs being rounded areas, the process comprising:
   hardening all bearing locations and rounded areas of the crankshaft to provide a hardening layer of a predetermined depth at the bearing locations and rounded areas;
   tempering the hardening layer at the bearing locations and rounded zones to a predetermined hardness value which permits subsequent alignment of the crankshaft at the rounded areas;
   hardening only the bearing locations without affecting the rounded areas so as to provide a further hardening layer having a predetermined depth on the first mentioned hardening layer; and
   tempering the entire crankshaft to eliminate internal stresses therein.

2. A process according to claim 1, wherein the step of hardening all the bearing locations and rounded areas and the step of hardening only the bearing locations are effected by induction hardening.

3. A process according to claim 2, wherein the step of hardening only the bearing location includes providing a further hardened layer of a depth which is less than the depth of the first mentioned hardened layer.

4. A process according to claim 1, wherein the step of hardening all the bearing locations and rounded areas includes hardening said locations and said areas to a Rockwell hardness value of at least 60 with said predetermined depth of the hardening layer being in the range of 6–9 mm.

5. A process according to claim 4, wherein the step of tempering the hardening layer at the bearing locations and rounded areas includes tempering said locations and said areas to a Rockwell hardness value of at least 42.

6. A process according to claim 5, wherein the step of hardening only the bearing locations includes providing a further hardened layer having a depth of at least 3 mm.

7. A process according to claim 6, wherein the step of hardening only the bearing locations includes hardening only said locations to a Rockwell hardness value of at least 60.

8. A process according to claim 7, wherein the step of tempering the entire crankshaft includes tempering the further hardened layer to a Rockwell hardness value in the range of 50–53.

9. A process according to claim 1, wherein the step of hardening only the bearing locations includes providing a further hardened layer having a depth of at least 3 mm.

10. A process according to claim 9, wherein the step of hardening all the bearing locations and rounded areas of the crankshaft includes providing a hardening layer having a depth in the range of 6–9 mm.

* * * * *